United States Patent
Stevens et al.

(10) Patent No.: US 8,157,272 B2
(45) Date of Patent: Apr. 17, 2012

(54) SHOPPING CART WITH CHILD CARRIER APPARATUS HAVING A B-PILLAR RESTRAINT REGION

(75) Inventors: Adam P. Stevens, York, ME (US); Daniel B. Ballou, Salem, MA (US); David S. McCue, Manchester, MA (US)

(73) Assignee: McCue Corporation, Salem, MA (US)

(*) Notice: Subject to any disclaimer, the term of this patent is extended or adjusted under 35 U.S.C. 154(b) by 626 days.

(21) Appl. No.: 11/920,039

(22) PCT Filed: May 18, 2006

(86) PCT No.: PCT/US2006/019439
§ 371 (c)(1),
(2), (4) Date: Dec. 30, 2008

(87) PCT Pub. No.: WO2006/127456
PCT Pub. Date: Nov. 30, 2006

(65) Prior Publication Data
US 2009/0102177 A1    Apr. 23, 2009

Related U.S. Application Data

(60) Provisional application No. 60/683,236, filed on May 20, 2005.

(51) Int. Cl.
*B62D 39/00* (2006.01)
(52) U.S. Cl. .............................. 280/33.993; 280/33.992
(58) Field of Classification Search ............. 280/33.992, 280/33.993, 827
See application file for complete search history.

(56) References Cited

U.S. PATENT DOCUMENTS

| 6,572,122 | B2 | 6/2003 | Johnson et al. |
| 6,746,030 | B1 | 6/2004 | Bartlett et al. |
| 7,073,800 | B2 | 7/2006 | Shaw et al. |

FOREIGN PATENT DOCUMENTS

| JP | 2001-225753 | 8/2001 |
| JP | 2001225753 A | * 8/2001 |
| JP | 2002-362373 | 12/2002 |
| JP | 2002362373 A | * 12/2002 |

OTHER PUBLICATIONS

International Search Report for Application No. PCT/US06/19439, dated May 8, 2007.

* cited by examiner

*Primary Examiner* — Katy M Ebner
(74) *Attorney, Agent, or Firm* — Occhiuti Rohlicek & Tsao LLP (57) ABSTRACT

A shopping cart with child carrying apparatus suitable for storage and conveyance of a conventional capacity of food or other products can also transport and entertain at least one child. The shopping cart has at least one storage basket, as well as a child carrier coupled forward and external of the basket. The child carrier simulates a vehicle to provide a relatively easier shopping experience for the guardian and a more enjoyable shopping experience for the child. The child carrying apparatus includes a doorway having a B-pillar restraint region that restrains the child occupant from leaning out from the child carrying apparatus, while simultaneously providing a substantially unobstructed view sideways from the child carrying apparatus.

18 Claims, 5 Drawing Sheets

SHOPPING CART WITH CHILD CARRIER APPARATUS HAVING A B-PILLAR RESTRAINT REGION

RELATED APPLICATION

This application claims priority to U.S. Provisional Application No. 60/683,236, filed May 20, 2005, for all subject matter common to this application. The disclosure of said provisional application is hereby incorporated by reference in its entirety.

FIELD OF THE INVENTION

The present invention relates to an improved shopping cart suitable for storage and conveyance of a conventional capacity of food or other products, while also transporting and entertaining at least one child. More particularly, the child transporting portion of the cart maintains a restraining B-pillar restraint region that prevents the child from leaning out of the child carrier while seated, and additionally does not substantially block sideways views through the doorway of the carrier.

BACKGROUND OF THE INVENTION

Conventional carts, such as shopping carts, can store and/or convey or transport groceries or other products. The carts range in size from smaller, more portable, luggage rollers to larger capacity shopping carts or platforms suitable for more voluminous objects.

These known carts can have any one of a number of different child seating structures attached thereto, providing a location for a child to sit while the cart is utilized for transporting goods, such as while shopping in a store. Conventional carts often have a collapsible child seat near a handle of the cart, suitable for one or two children.

One solution to the problem of providing a useful cart in combination with a child carrying apparatus is disclosed in U.S. Pat. No. 6,513,817, which is co-owned with the present application. The shopping cart has at least one storage basket, as well as a child carrier integrally mounted below and forward of the basket. The child carrier simulates a vehicle to provide a relatively easier shopping experience for the guardian and a more enjoyable shopping experience for the child. In order to provide some hindrance of the child attempting to lean out of the vehicle from the seated position, the child carrier of this device includes the use of a swing arm. However, the swing arm can be cumbersome to operate, can actually become a toy for the child occupant who can raise and lower the arm, and when not in the proper closed and locked position, can reduce its effectiveness at preventing or hindering the child from leaning out of the vehicle during operation.

SUMMARY OF THE INVENTION

There exists in the art a need for a cart having storage capacity substantially equivalent to a standard shopping cart, while also providing additional structure for transporting and entertaining one or more children, wherein the child transporting structure provides a more consistent barrier or restraint to prevent or hinder child occupants from leaning out of the vehicle, but also without blocking the side views of the child occupant while properly seated. The present invention is directed toward further solutions in this art.

In accordance with one example embodiment of the present invention, a child carrying apparatus is coupled with a shopping cart having a storage basket. The child carrying apparatus includes a body shaped to resemble a vehicle and having a front end, a rear end, and at least one side wall. A forward facing seat can be disposed in the body, the seat having a base with a forward edge and a seatback having an upper edge, providing a seated child occupant with a forward view out of the body. The at least one side wall defines a doorway providing access to the seat, the doorway having a forward edge at a side wall A-pillar region, a lower edge at a side wall sill region, and a rearward edge at a side wall B-pillar restraint region. A lower portion of the B-pillar restraint region forms the rearward edge of the doorway at a location about adjacent to the forward edge of the seat base, and an upper portion of the B-pillar restraint region forms the rearward edge of the doorway at a location about adjacent to the upper edge of the seatback and proximal to a shoulder region of the seated child occupant to enable the seated child occupant to have a substantially unobstructed side view out of the body up to at least about 90 degrees offset from the forward view. Furthermore, the B-pillar restraint region prevents the seated child occupant from leaning his or her torso region out of the body while seated.

In accordance with aspects of the present invention, the body further includes a roof suitable for protecting the children from falling objects. A transition can be provided between the upper portion of the B-pillar restraint region and the lower portion of the B-pillar restraint region. The transition can be one of a smooth transition or a stepped transition. The B-pillar restraint region can be formed of a separate component mounted to the body. The B-pillar restraint region can be alternatively integrally formed as a portion of the body. The rearward edge of the doorway can maintain a distance forward of the child that is substantially the same at least from adjacent the shoulder region of the child to the lower edge of the doorway. The rearward edge of the doorway can extend forward of the child a lesser amount at a location proximal to the lower edge of the doorway relative to the distance forward of the child that the rearward edge of the doorway extends adjacent the shoulder region of the child.

In accordance with further aspects of the present invention, a grid floor can be disposed in the body. The vehicle shape can be a shape resembling a transportation vehicle, such as an automobile. At least one bumper can be provided to protect the body in case of collision or abrasion.

In accordance with one embodiment of the present invention, a child carrying apparatus coupled with a shopping cart having a storage basket includes a body shaped to resemble a vehicle and having a front end, a rear end, and at least one side wall. A forward facing seat can be disposed in the body, the seat having a base with a forward edge and a seatback having an upper edge, providing a seated child occupant with a forward view out of the body. The at least one side wall defines a doorway providing access to the seat, the doorway having a forward edge at a side wall A-pillar region, a lower edge at a side wall sill region, and a rearward edge at a side wall B-pillar restraint region. A lower portion of the B-pillar restraint region forms the rearward edge of the doorway at a location forward of the seatback a distance of at least about 50% of the depth of the seat base, and an upper portion of the B-pillar restraint region forms the rearward edge of the doorway at a location about adjacent to the upper edge of the seatback and proximal to a shoulder region of the seated child occupant to enable the seated child occupant to have a substantially unobstructed side view out of the body up to at least about 90 degrees offset from the forward view. Furthermore, the B-pillar restraint region prevents the seated child occupant from leaning his or her torso region out of the body while seated.

BRIEF DESCRIPTION OF THE DRAWINGS

The present invention will become better understood with reference to the following description and accompanying drawings, wherein.

DETAILED DESCRIPTION OF THE INVENTION

The present invention generally relates to a cart and child carrying apparatus for shopping. The shopping cart and child carrying apparatus is suitable for storage and conveyance of a conventional capacity of food or other products while also transporting and entertaining at least one child. The cart has an upper basket area mounted to a lower frame that supports one or more casters or wheels. The upper basket is disposed above and behind a child carrier containing a seat suitable for child-sized individuals. The child carrier can further include a roof, a back wall, a rear bed for additional cart storage capacity, and additional accessories such as a steering wheel and a rear view mirror and/or mirror housing. The child carrier is intended to resemble a vehicle, which offers entertainment value and thereby enhances the child passenger's experience.

The arrangement of the child carrier, forward of the basket and proximal to the ground upon which the cart rests, provides for a significantly lower center of gravity for the passengers within the child carrier. The lower center of gravity hinders accidental tipping of the cart. In addition, the roof and the back wall of the child carrier hinder the passenger of the child carrier from accessing any of the items stored in the cart, thus denying unwanted tampering with the items. The child carrier can also include child carrier wheels that do not make contact with the surface below the cart, and do not serve as active wheels enabling the cart to roll. The child carrier wheels can, however, provide added anti-tipping support should the cart begin to tip sideways. In addition, the child carrier can include a shoulder height retaining wall on either side across a door portion of the child carrier. The shoulder height retaining wall, or B-pillar restraint region, hinders a child passenger from leaving the cart unexpectedly, and further enhances the safety of the child passenger by providing added protection in case of collision or falling items. When a child is seated within the child carrier, the child is prevented from leaning out of the carrier because of the B-pillar restraint region. However, an upper portion of the B-pillar restraint region is recessed or offset in a rearward direction, thus enabling the child to be able to see out sideways from the carrier without needing to lean forward. Thus, the child can see both forward and sideways from the carrier without leaning from a fully seated position, and also is restrained without need of a more complex door or swing arm restraining device.

FIGS. 1 through 5C, wherein like parts are designated by like reference numerals throughout, illustrate an example embodiment of a shopping cart and child carrying apparatus according to the present invention. Although the present invention will be described with reference to the example embodiments illustrated in the figures, it should be understood that many alternative forms can embody the present invention. One of ordinary skill in the art will additionally appreciate different ways to alter the parameters of the embodiments disclosed, such as the size, shape, or type of elements or materials, in a manner still in keeping with the spirit and scope of the present invention.

Figure 1:
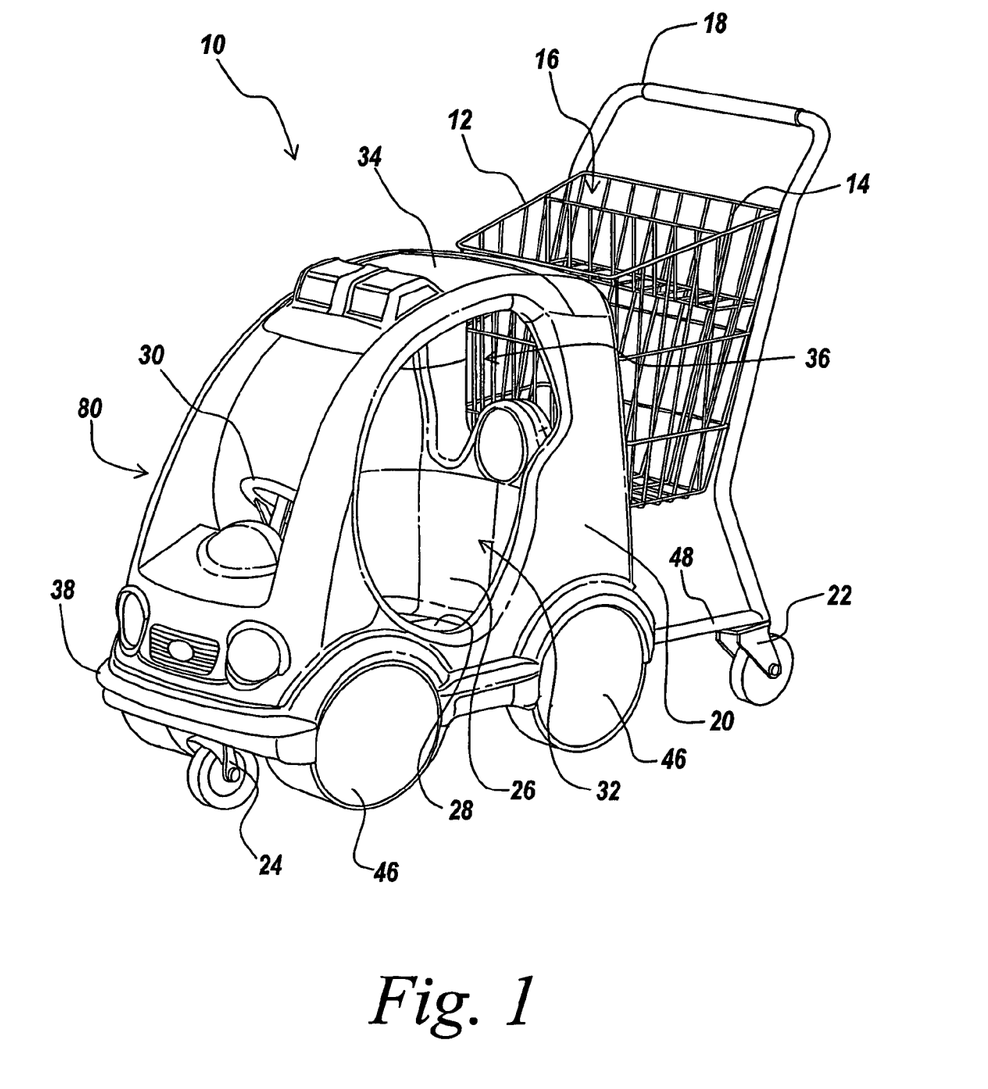
FIG. 1 is a perspective illustration of a shopping cart and child carrying apparatus attached thereto, according to one embodiment of the present invention.

FIG. 1 illustrates a perspective view of a shopping cart and child carrying apparatus 10, according to one embodiment of the present invention. The shopping cart and child carrying apparatus 10 has a main basket 12 of typical size for a shopping cart (e.g., 10,000 cubic inches). The main basket 12 can include a swing back panel 14, to aid in the nesting of the baskets 12 during shipping or storage. The swing back panel 14 raises when a second basket 12 is pushed into the swing back panel 14, thus compressing the two baskets 12 into an area less than the sum of each basket's 12 individual length. The arrangement allows for the stacking of multiple shopping carts with child carrying apparatus' 10 as well, utilizing the swing back panel 14 feature, if desired.

There is also an optional rear-facing child seat 16 integral with the main basket 12. The rear-facing child seat 16 folds away when not in use, and unfolds to provide a seat suitable for an infant or small child. A resting device, such as a seat belt, can be included to hold the infant in place.

A handle 18 extends from a back end of the shopping cart and child carrying apparatus 10 for an individual to push and maneuver the shopping cart and child carrying apparatus 10 as desired. The size and shape of the shopping cart and child carrying apparatus 10 enables an individual user to experience handling characteristics similar to a standard shopping cart.

Figure 2A:
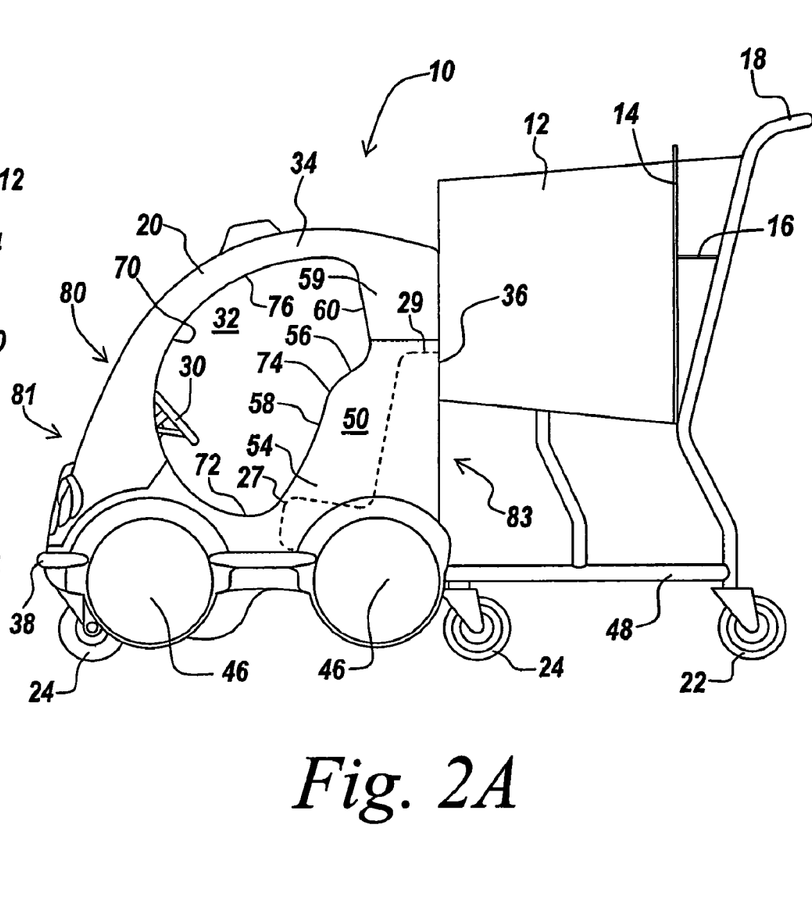
FIG. 2A is a diagrammatic side view of the shopping cart of FIG. 1, in accordance with aspects of the present invention.
Figure 2B:
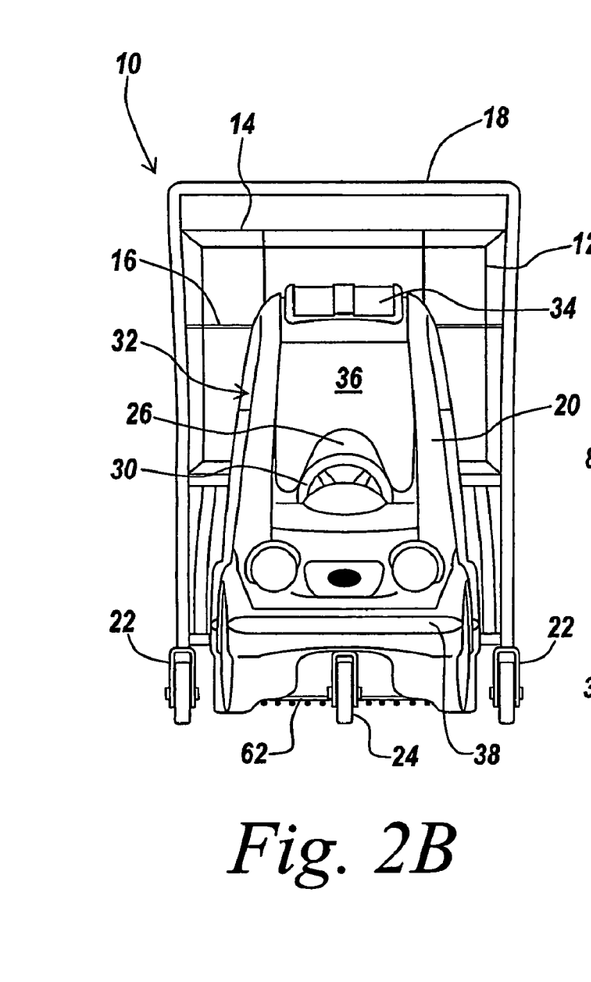
FIG. 2B is a diagrammatic front view of the shopping cart of FIG. 2A, in accordance with aspects of the present invention.

The shopping cart and child carrying apparatus 10 rolls on at least one caster (see also FIGS. 2A and 2B). The shopping cart and child carrying apparatus 10 illustrated has two non-swivel caster wheels 22, one at each distal corner at a rear portion of the shopping cart and child carrying apparatus 10, a pair of swivel caster wheels 24 in a central portion of the shopping cart and child carrying apparatus 10, and at least one swivel caster wheel 24 at a front end portion of the shopping cart and child carrying apparatus 10. However, there can be a different number of non-swivel caster wheels 22 and swivel caster wheels 24, and in different configurations, as long as the shopping cart and child carrying apparatus 10 is suitably supported in a manner that permits an individual to push and maneuver the shopping cart and child carrying apparatus 10 as desired. Each caster wheel is of a non-marking variety, thus significantly preventing the wheels from leaving scuffs or other marks on any surface upon which the shopping cart and child carrying apparatus 10 is typically utilized.

In the illustrated embodiment, a vehicle resembling child carrier 20 is disposed underneath and forward of the basket 12. The child carrier 20 includes a seat 26 shaped and sized to enable a child to sit comfortably within the child carrier 20. There is also a steering wheel 30 on a dashboard section internal to the child carrier 20. The steering wheel 30 can rotate as desired, but does not control the steering of the shopping cart and child carrying apparatus 10. The steering wheel 30 can further serve to mount an entertainment console (not shown). The console can take the form of a mounting bracket for different electronic game devices, or can actually provide the electronic game devices. The console can mount on the steering wheel 30, or on another location in a dashboard area of the child carrier 20 that is accessible by the child passenger.

The child carrier 20 has a roof 34, in accordance with one embodiment, which serves to make the child carrier 20 better resemble a transportation vehicle. The roof 34 also serves to protect the child passenger from items accidentally dropped from above, or falling out of the basket 12. However, one of ordinary skill in the art will appreciate that the roof 34 is not required, such as in embodiments where the vehicle is a convertible.

A bumper 38 can be provided at peripheral edges of the child carrier 20 to protect the child carrier 20 and shopping cart and child carrying apparatus 10 from damage in case of impact with surrounding objects. In addition, the bumper 38 can serve to protect the child carrier 20 and the shopping cart and child carrying apparatus 10 from abrasion, further extending the life of the child carrier 20 and the shopping cart and child carrying apparatus 10. The bumper 38 can be removable and/or replaceable if desired.

A back wall 36 in the child carrier 20 hinders the child passengers of the child carrier 20 from accessing the items placed in the main basket 12. The back wall 36 can be solid (as shown in FIG. 2B), or can include a window opening (as shown in FIG. 1). In embodiments having a window opening, the position of the child carrier 20 relative to the basket 12 is such that the front side of the basket 12, reachable by the child passenger, still prevents the child passenger from reaching into the basket 12.

There are secondary wheels 46 at distal corners of the child carrier 20. The secondary wheels 46 do not contact the ground upon which the shopping cart and child carrying apparatus 10 rests in normal operation, and do not continually support the weight of the child carrier 20, the basket 12, the items within the shopping cart and child carrying apparatus 10, or the child passengers. The non-swivel caster wheels 22 and swivel caster wheels 24 support the full weight of the shopping cart and child carrying apparatus 10 and its contents under normal circumstances. The secondary wheels 46 of the child carrier 20 are decorative and aesthetically combine with the look of the child carrier 20 to make it appear more like a vehicle. The secondary wheels 46 can be integral with the child carrier 20, or can be separate elements, fixed or rotatably mounted on the child carrier 20 or other portions of the shopping cart and child carrying apparatus 10. The secondary wheels 46 can also serve to hinder tipping of the shopping cart and child carrying apparatus 10, in that if the shopping cart and child carrying apparatus 10 begins to tip sideways, the secondary wheels 46 come into contact with the floor or ground and provide a stabilizing force and structure, hindering further tipping.

The child carrier 20 can further include a curved profile 80 at a front end 81, in accordance with one embodiment of the invention. The curved profile 80 extends from the bumper 38 to the roof 34 of the child carrier 20 in the form of a gradual curve. The curved profile 80 of the child carrier 20 affects the manner by which the child carrier 20 initiates a nesting operation with another shopping cart and child carrying apparatus 10. One of ordinary skill in the art will appreciate that the curved profile 80 of the present invention need not be an actual continuous curve. Rather, the curve profile 80 can include variations, such as, e.g., a hood section of a car, that generally follow the overall profile of being angled or curved backward, such that upper portions of the child carrier at the front, e.g., proximal to the roof 34, are displaced further backward relative to lower portions of the child carrier, e.g., the bumper 38. Likewise, one of ordinary skill in the art will appreciate that a curved profile is merely representative of one embodiment of the invention and is not necessary to implement the B-pillar restraint region as later described herein.

The child carrier mounts at a rear end 83 with the basket 12 and a frame 48 to form the shopping cart and child carrying apparatus 10 by use of standard fasteners, adhesive, welding, hook and fiber, or other attachment means as understood by one of ordinary skill in the art.

FIGS. 2A, 2B, 3A, 3B, 4A, and 4B are diagrammatic front and side views of embodiments of the shopping cart and child carrying apparatus 10 with the child carrier 20 attached thereto. There can be a grid floor 62 extending below the frame 48, to provide added foot space for the child passenger. The grid floor 62 allows items or liquids to be dropped through the grid to the surface below, thus reducing the likelihood of dirt or spilled liquid buildup. In addition, the grid floor 62 provides a safer environment for the child passenger by keeping their feet inside the child carrier 20 and away from the floor/ground and wheels.

FIGS. 2A and 2B further illustrate that the custom molded child carrier 20 and custom basket 12 results in a fully integrated unit. The child carrier 20 is formed of plastic, but can be formed of a number of different materials, including plastics, composites, metals, and the like, providing the ability to shape the child carrier 20 into vehicle shapes. The main basket 12 and frame 48 of the shopping cart portion can likewise be formed of a number of different materials, including metal, plastic, and composites. The resulting cart must have the ability to couple with the child carrier 20, while also being able to support typical loads experienced by shopping carts.

In the embodiment illustrated in FIGS. 2A and 2B, the child carrier 20 has a single swivel caster wheel 24 at its front end. In addition, the main basket 12 is of a medium capacity relative to typical shopping cart capacities (approximately 12,000 cubic inches). The main basket 12 includes the swing back panel 14 supporting the rear-facing child seat 16. As illustrated, the rear-facing child seat 16 includes capacity for one or two small children or infants, as is conventional with shopping carts. The child carrier 20 as illustrated has only a single seat 26, thus has capacity for a single child passenger. The child passenger enters and exits the child carrier 20 through a doorway 32, and can be restrained within the child carrier 20 using common restraints, such as a seat belt (not shown).

In addition, the shopping cart and child carrying apparatus 10 of the present invention provides an effective restraint mechanism to prevent a child passenger from leaning out of the child carrier 20 while still substantially seated, that does not hinder the child passenger's view out sideways from the child carrier 20. The restraint mechanism is formed of a B-pillar restraint region 50 that exists as a portion of the side wall of the child carrier 20 body. The B-pillar restraint region 50 can be integrally molded, or otherwise formed, with the child carrier 20 body. Alternatively, the B-pillar restraint region 50 can be a separate component mounted to the child carrier 20 body. A separate component can provide greater flexibility in altering the shape, or color, of the B-pillar restraint region 50, if desired.

The B-pillar restraint region 50 is formed of an upper portion 52 and a lower portion 54 at a rearward edge of the doorway 32. The doorway 32 itself is formed of a forward edge 70 along an A-pillar region, a lower edge 72 along a sill region, and a rearward edge 74 along a forward edge of the B-pillar restraint region 50. Likewise, in embodiments having roofs 34, the doorway 32 additionally is formed with an upper edge 76.

Figure 5A:
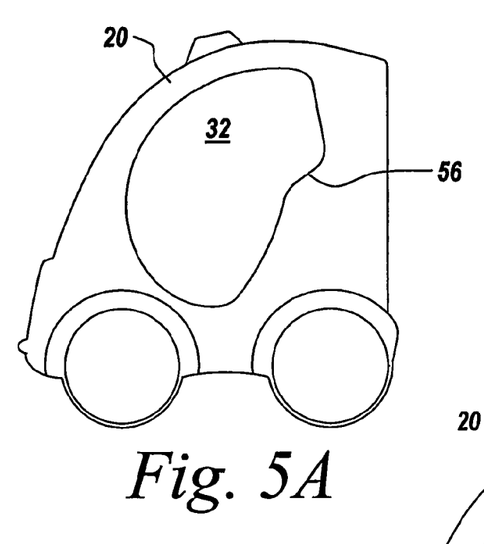
FIG. 5A is a diagrammatic side view of the child carrier with B-pillar restraint region transition, in accordance with aspects of the present invention.
Figure 5B:
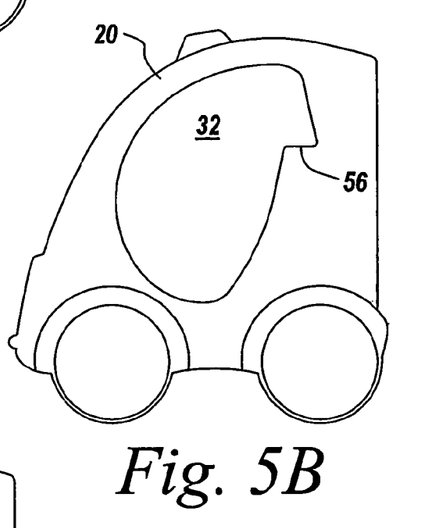
FIG. 5B is a diagrammatic side view of the child carrier with an alternative B-pillar restraint region transition, in accordance with aspects of the present invention.
Figure 5C:
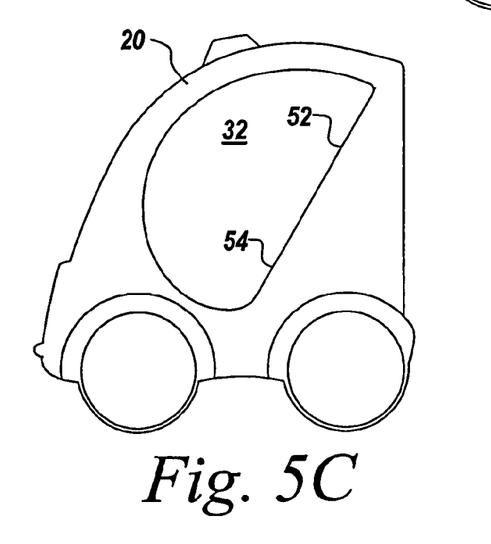
FIG. 5C is a diagrammatic side view of the child carrier with an alternative B-pillar restraint region transition, in accordance with aspects of the present invention.

The upper portion 52 is rearwardly offset relative to the lower portion 54, and can have a transition 56 therebetween (although as shown in FIG. 5C, a transition 56 is not required). The seat 26 is formed of a base with a front edge 27 and a seatback with an upper edge 29. The position of the seat 26 within the child carrier 20 relative to the B-pillar restraint region 50 is a crucial relationship. In order for the B-pillar restraint region 50 to prevent the child passenger from leaning out of the child carrier 20, or even extending their arms out sideways from the child carrier, there must be sufficient distance between the seatback and the rearward edge of the doorway 32 as formed by the B-pillar restraint region 50 to provide adequate depth to restrain such movement. Said differently, if the distance between the seatback of the seat 26 and the rearward edge of the doorway 32 (i.e., the front edge of the B-pillar restraint region 50) were merely a few inches, the child passenger properly seated in the seat 26 could easily extend their arms beyond the threshold of the B-pillar restraint region 50 and doorway and could also relatively easily lean forward and sideways to lean out of the child carrier 20. Instead, in accordance with the present invention, the distance between the seatback of the seat 26 and a front edge 58 of the lower portion 54 of the B-pillar restraint region 50 is such that the child passenger cannot easily extend their arms out, and cannot lean their body out, of the child carrier 20. Accordingly, the distance from the seatback to the front edge 58 of the B-pillar restraint region 50 is relatively more equivalent to the depth of the child passenger's torso.

A different metric offering the same relationship of the B-pillar restraint region 50 to the seat 26 can be detailed as follows. The front edge 27 of the base of the seat 26 is at least approximately adjacent the front edge of the B-pillar restraint region 50 (i.e., the front edge 58 of the lower portion 54 of the B-pillar restraint region 50) and can be further forward of the front edge 58 of the lower portion 54 of the B-pillar restraint region 50, or slightly rearward of the front edge 58 of the lower portion 54 of the B-pillar restraint region 50. However, the front edge 27 of the base of the seat 26 cannot be substantially rearward of the front edge 58 of the lower portion 54 of the B-pillar restraint region 50. As utilized in this with regard to the position of the front edge 58, the phrase "substantially rearward" indicates a distance equivalent to about at least 50% of the depth of the base of the seat 26. This relationship provides sufficient depth to the seat 26 to create the barrier or restraint capability of the B-pillar restraint region 50. Additionally, the upper edge 29 of the seatback of the seat 26 is approximately adjacent the front edge of the B-pillar restraint region (i.e., the front edge 60 of the upper portion 52 of the B-pillar restraint region 50). This relationship provides a configuration where the typical child passenger can see out sideways from the child carrier 20 passed the B-pillar restraint region 50 without leaning forward, or out sideways, as described below.

Although the lower portion 54 of the B-pillar restraint region 50 extends forward as described, a front edge 60 of the upper portion 52, after the transition 56 when the design utilizes a transition, is offset rearwardly relative to the front edge 58 of the lower portion 54. However, if a transition 56 occurs, it is located at about or approximately the average height of the shoulder of the child passenger when seated. Accordingly, the rearward offset of the front edge 58 of the upper portion 52 enables the child passenger to easily see out of the child carrier 20 without visual hindrance by the B-pillar restraint region 50. The sideways view out of the child carrier 20 as referred to herein is meant to include a view that is substantially at least 90 degrees rotated or offset from a view directly forward of the child carrier 20. The sideways view can include views that are even further rotated from the front view, such as to an extent of 100 degrees, 110 degrees, 120 degrees, or further up to a maximum of 179 degrees. However, one of ordinary skill in the art will appreciate that a generally accepted sideways view is more often characterized as between about 60 degrees and about 120 degrees rotated or offset from a directly forward view. Simultaneous with the provision of the sideways view by the B-pillar restraint region 50, the lower portion 54 of the B-pillar restraint region 50 constantly maintains a restraint barrier preventing the child passenger from easily leaning out of the child carrier 20 or extending their arms out sideways from the child carrier 20.

Figure 3A:
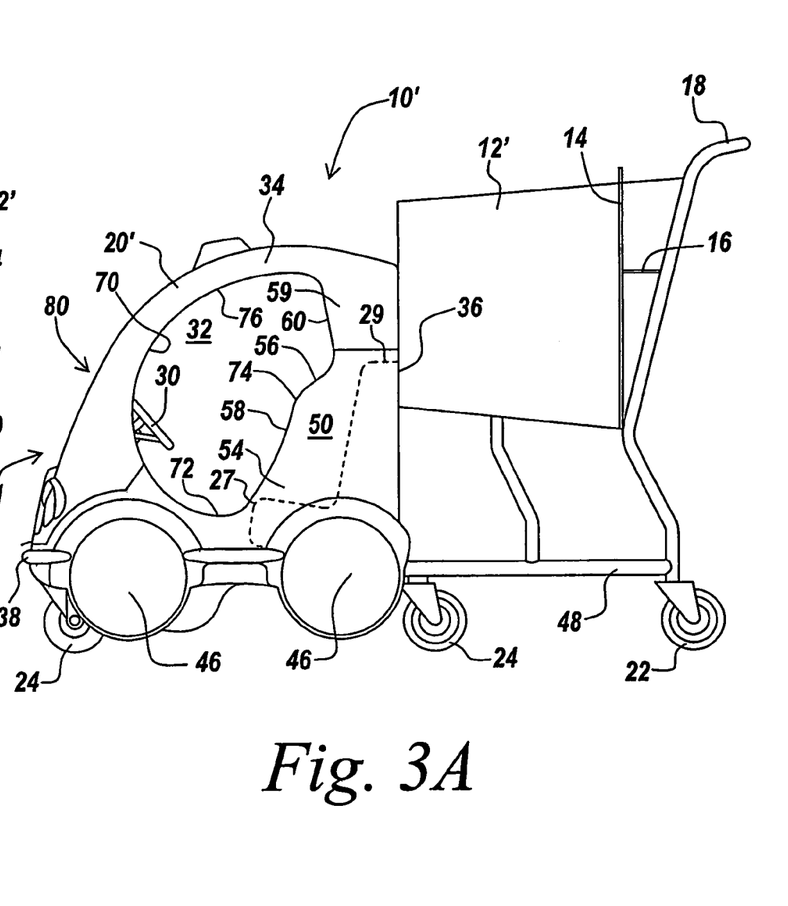
FIG. 3A is a diagrammatic side view of a shopping cart having two front wheels, in accordance with aspects of the present invention.
Figure 3B:
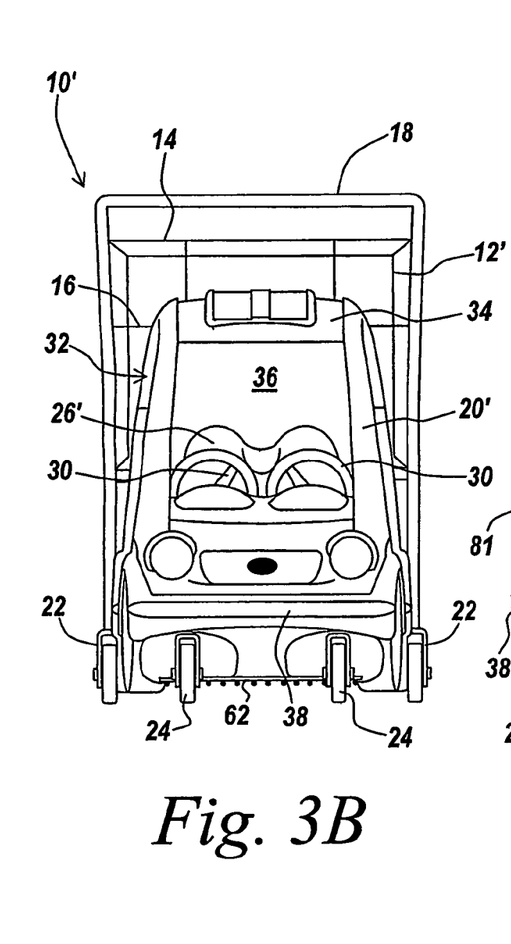
FIG. 3B is a diagrammatic front view of the shopping cart of FIG. 3A, in accordance with aspects of the present invention.

In the embodiment illustrated in FIGS. 3A and 3B, a shopping cart and child carrying apparatus 10' is shown. The difference in this embodiment relative to the previously discussed embodiment is that the shopping cart and child carrying apparatus 10' makes use of a child carrier 20' having larger child seating capacity. The shopping cart and child carrying apparatus 10' has two seats 26, and two steering wheels 30. Thus the child carrier 20' portion is designed to transport and entertain up to two child passengers. Thus, the previously discussed shopping cart and child carrying apparatus 10 has a total child carrying capacity of three child passengers, while the shopping cart and child carrying apparatus 10' has a total child carrying capacity of four child passengers. In addition a medium capacity main basket 12' is provided, verses the small capacity main basket 12 of the previous embodiment.

Figure 4A:
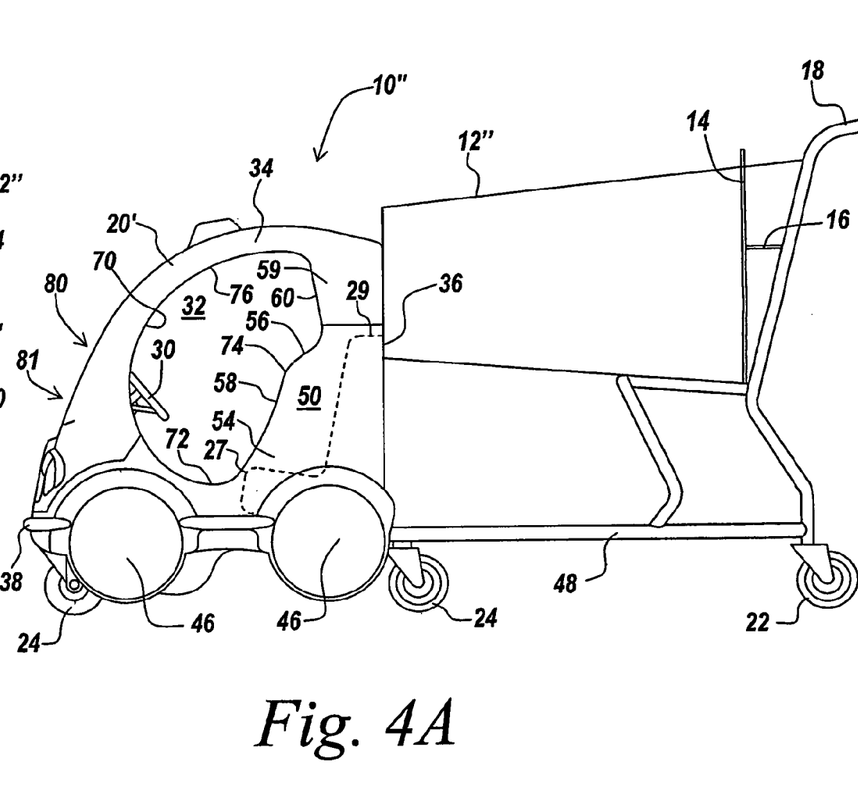
FIG. 4A is a diagrammatic side view of a shopping cart having a large capacity basket, in accordance with aspects of the present invention.
Figure 4B:
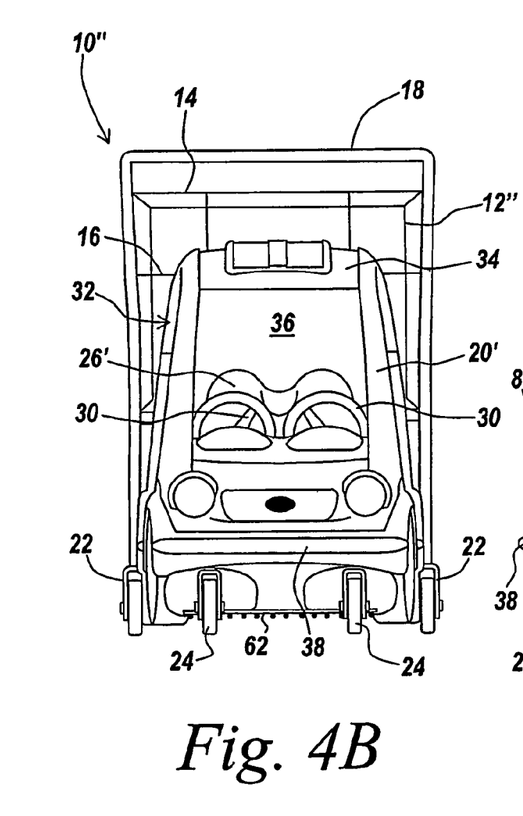
FIG. 4B is a diagrammatic front view of the shopping cart of FIG. 4A, in accordance with aspects of the present invention.

FIGS. 4A and 4B illustrate still another embodiment of a shopping cart and child carrying apparatus 10". In this embodiment, the larger capacity child carrier 20' couples with a larger capacity main basket 12". Whereas the previously illustrated basket was of medium capacity, the main basket 12" of the presently discussed embodiment is a large capacity basket (approximately 12,500 cubic inches).

FIGS. 5A, 5B, and 5C illustrate side views of various embodiments of the transition 56 between the upper portion 52 and the lower portion 54 of the B-pillar restraint region 50. As shown in FIG. 5A, the transition 56 can be formed of a relatively smooth curvilinear shape. Alternatively, as shown in FIG. 5B, the transition can be formed of a relatively stepwise shape. A further alternative, as shown in FIG. 5C, provides no transition between the upper portion 52 and lower portion 54 of the B-pillar restraint region. One of ordinary skill in the art will appreciate that other variations in the shape of the transition 56 between the upper portion 52 and the lower portion 54 of the B-pillar restraint region 50 can be implemented in accordance with the present invention. Accordingly, such variations are anticipated by the present claimed invention.

The variation of embodiments between FIGS. 2A, 2B, 3A, 3B, 4A, 4B, 5A, 5B, and 5C is illustrative of modular and custom capabilities of the design of the present invention. One of ordinary skill in the art viewing these embodiments will appreciate that a number of different component combinations are possible, where different size and shape child carriers 20 can be coupled with different size and shape main baskets 12. For example, child carriers 20 having seating for 1, 2, or more, child passengers can be used to form the shopping cart and child carrying apparatus 10. The child carrier 20 of the shopping cart and child carrying apparatus 10 can be any number of different transportation vehicle shapes, such as automobile, sled, truck, bus, train, aircraft, spacecraft, ship, and the like, to add to the entertainment of the child passengers and increase their desire to ride in the child carrier 20. Furthermore, the shape of the B-pillar restraint region 50 can vary and still provide the restraint functionality in conjunction with the substantially unobstructed sideways view.

Additionally, the size and shape of the basket 12 coupled with the child carrier 20 can also vary, including smaller baskets from about 3,000 cubic inches or 3,500 cubic inches to larger baskets of about 12,500 cubic inches or 15,000 cubic inches. Baskets having larger or smaller capacities than those mentioned herein are also anticipated by the present invention, and would be incorporated into the shopping cart and child carrying apparatus 10 based on specific requirements of a purchaser or shopping facility.

The child carrier 20 is bolted to the frame 48 of the main basket 12 to enable easy customization of specific child carrier 20 with specific basket 12 size. One of ordinary skill in the art will appreciate that any number of common fastening techniques can be utilized to couple the child carrier 20 with the frame 48 or main basket 12 to form the shopping cart and child carrying apparatus 10.

The decorative secondary wheels 46 make the child carrier 20 look more realistic, but do not encourage theft for the "toy" aspect of the shopping cart and child carrying apparatus 10 because the secondary wheels 46 are not designed to support the child carrier 20 for transportation functionality, and they are not linked to the steering wheel 26. The child carrier 20 is not designed to operate as a vehicle separate from the shopping cart and child carrying apparatus 10. Seat belts or other restraint devices can be provided for added safety.

The handling characteristics of the shopping cart and child carrying apparatus 10 are substantially similar to standard shopping carts, given the use of the swivel caster wheels 24. The similar handling characteristics reduce the likelihood of unwanted collisions, and do not unduly strain the individual by requiring excessive forces to maneuver the shopping cart and child carrying apparatus 10. The overall length can vary, however, as understood by one of ordinary skill in the art to provide for larger or smaller carts.

Numerous modifications and alternative embodiments of the invention will be apparent to those skilled in the art in view of the foregoing description. Accordingly, this description is to be construed as illustrative only and is for the purpose of teaching those skilled in the art the best mode for carrying out the invention. Details of the structure may vary substantially without departing from the spirit of the invention, and exclusive use of all modifications that come within the scope of the appended claims is reserved. It is intended that the invention be limited only to the extent required by the appended claims and the applicable rules of law.

What is claimed is:

1. A child carrying apparatus coupled with a shopping cart having a storage basket, the child carrying apparatus comprising:
   a body shaped to resemble a vehicle and having a front end, a rear end, and at least one side wall;
   a forward facing seat disposed in the body, the seat having a base with a forward edge and a seatback having an upper edge, providing a seated child occupant with a forward view out of the body; and
   the at least one side wall defining a doorway providing access to the seat, the doorway having a forward edge at a side wall A-pillar region, a lower edge at a side wall sill region, and a rearward edge at a side wall B-pillar restraint region;
   wherein
   a lower portion of the B-pillar restraint region forms the rearward edge of the doorway at a location about adjacent to the forward edge of the seat base,
   an upper portion of the B-pillar restraint region forms the rearward edge of the doorway at a location that is above the lower portion and rearward relative to the lower portion such that a transition portion is disposed between the upper portion and the lower portion, and
   the transition portion is located at or above a mid-height of the B-Pillar restraint region and configured to enable the seated child occupant to have a substantially unobstructed side view out of the body up to at least about 90 degrees offset from the forward view; and to prevent the seated child occupant from leaning his or her torso region out of the body while seated.

2. The apparatus according to claim 1, wherein the body further comprises a roof suitable for protecting the children from falling objects.

3. The apparatus according to claim 1, wherein the transition comprises one of a smooth transition and a stepped transition.

4. The apparatus according to claim 1, wherein the B-pillar restraint region is formed of a separate component mounted to the body.

5. The apparatus according to claim 1, wherein the B-pillar restraint region is integrally formed as a portion of the body.

6. The apparatus according to claim 1, wherein the rearward edge of the doorway maintains a distance forward of the child that is substantially the same at least from adjacent the shoulder region of the child to the lower edge of the doorway.

7. The apparatus according to claim 1, wherein rearward edge of the doorway extends forward of the child a lesser amount at a location proximal to the lower edge of the doorway relative to the distance forward of the child that the rearward edge of the doorway extends adjacent the shoulder region of the child.

8. The apparatus according to claim 1, further comprising a grid floor disposed in the body.

9. The apparatus according to claim 1, wherein the vehicle shape comprises a shape resembling a transportation vehicle.

10. The apparatus according to claim 1, wherein the vehicle shape comprises a shape resembling an automobile.

11. The apparatus according to claim 1, further comprising at least one bumper to protect the body in case of collision or abrasion.

12. A child carrying apparatus coupled with a shopping cart having a storage basket, the child carrying apparatus comprising:
   a body shaped to resemble a vehicle and having a front end, a rear end, and at least one side wall;
   a forward facing seat disposed in the body, the seat having a base with a forward edge and a seatback having an upper edge, providing a seated child occupant with a forward view out of the body; and the at least one side wall defining a doorway providing access to the seat, the doorway having a forward edge at a side wall A-pillar region, a lower edge at a side wall sill region, and a rearward edge at a side wall B-pillar restraint region;

wherein a lower portion of the B-pillar restraint region forms the rearward edge of the doorway at a location forward of the seatback a distance of at least about 50% of the depth of the seat base, an upper portion of the B-pillar restraint region forms the rearward edge of the doorway at a location that is above the lower portion and rearward relative to the lower portion such that a transition portion is disposed between the upper portion and the lower portion, and the transition portion is located at or above a mid-height of the B-Pillar restraint region and configured to enable the seated child occupant to have a substantially unobstructed side view out of the body up to at least about 90 degrees offset from the forward view; and to prevent the seated child occupant from leaning his or her torso region out of the body while seated.

13. The apparatus according to claim 12, wherein the body further comprises a roof suitable for protecting the children from falling objects.

14. The apparatus according to claim 12, wherein the transition comprises one of a smooth transition and a stepped transition.

15. The apparatus according to claim 12, wherein the B-pillar restraint region is formed of a separate component mounted to the body.

16. The apparatus according to claim 12, wherein the B-pillar restraint region is integrally formed as a portion of the body.

17. The apparatus according to claim 12, wherein the rearward edge of the doorway maintains a distance forward of the child that is substantially the same at least from adjacent the shoulder region of the child to the lower edge of the doorway.

18. The apparatus according to claim 12, wherein rearward edge of the doorway extends forward of the child a lesser amount at a location proximal to the lower edge of the doorway relative to the distance forward of the child that the rearward edge of the doorway extends adjacent the shoulder region of the child.

* * * * *